J. H. GLAUBER.
SUPPLY PIPE CONNECTION FOR BATH COCKS.
APPLICATION FILED DEC. 21, 1907.
922,471.
Patented May 25, 1909.
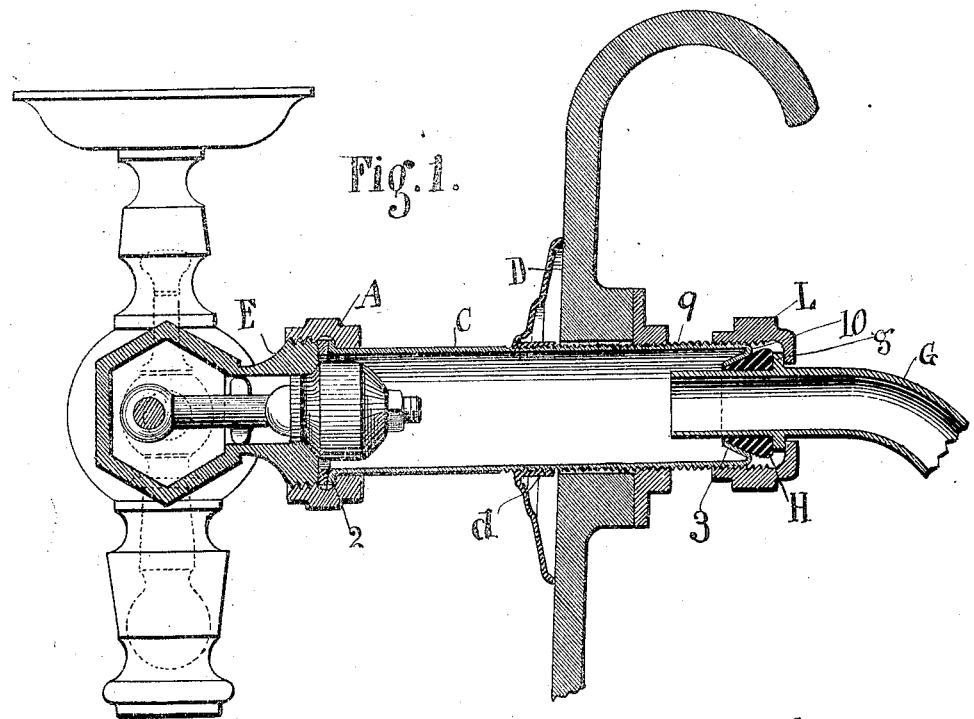
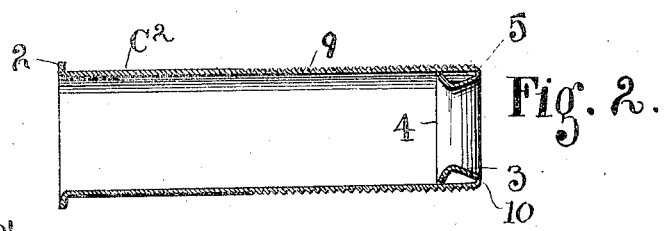
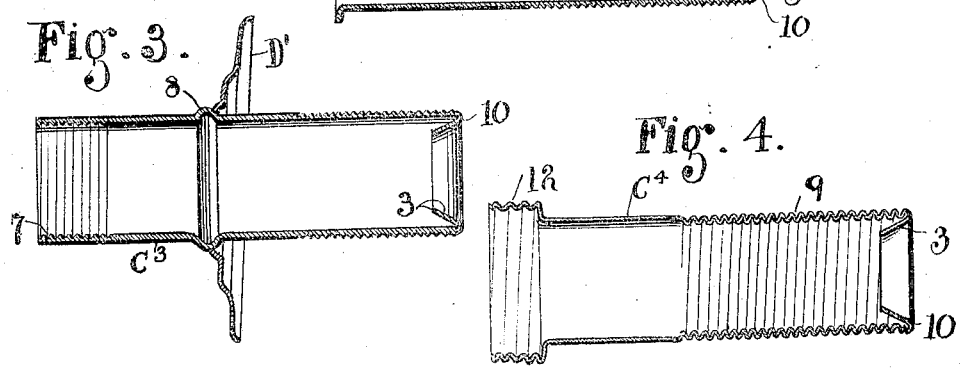
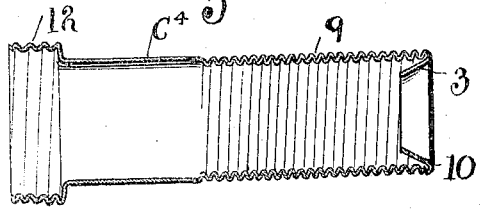
ATTEST
E. M. Fisher
F. C. Mussun
INVENTOR
Joseph H. Glauber.
BY Fisher + Moser ATTYS.

UNITED STATES PATENT OFFICE.

JOSEPH H. GLAUBER, OF CLEVELAND, OHIO.

SUPPLY-PIPE CONNECTION FOR BATH-COCKS.

No. 922,471.  Specification of Letters Patent.  Patented May 25, 1909.

Application filed December 21, 1907. Serial No. 407,529.

*To all whom it may concern:*

Be it known that I, JOSEPH H. GLAUBER, a citizen of the United States, residing at Cleveland, in the county of Cuyahoga and State of Ohio, have invented certain new and useful Improvements in Supply-Pipe Connections for Bath-Cocks, and do declare that the following is a full, clear, and exact description of the invention, which will enable others skilled in the art to which it appertains to make and use the same.

My invention relates to supply pipe connections for bath cocks and other water fixtures, and the invention consists more particularly in a new and improved tubular connection or shank, as herein shown and described and particularly pointed out in the claims.

In the accompanying drawings, Figure 1 is a sectional elevation of a complete connection comprising my new connecting member or shank sectioned longitudinally and coupled up in use. Figs. 2, 3, and 4 are longitudinal sectional views of four several modifications of the said connection or shank member, as hereinafter fully described.

Heretofore all coupling or connecting tubes or members corresponding to shank connection C herein have been made of cast metal, so far as I know and believe, but such connections, tubes or shanks thus constructed of cast metal, be they ever so well made, are subject to defects, which are never apparent until the article is machined, completed and tested, thereby causing great loss in time and labor and material. These defects are caused in many ways during casting operations, such as pouring the metal either too hot or too cold into the mold, having dirt in the molten metal, having the cores either too soft or too hard, or the cores improperly vented, or cores shifted out of true alinement. Any of the foregoing miscarriages of casting operations are apt to produce imperfect coupling tubes, subject to leakage under high pressures. Such cast shanks have also other inherent weaknesses, the result of forming an internal tapering seat at one end, and whereby splitting of the end and consequent leakage will occur when the coupling nut is overly tightened and the cast tapering head of the connecting member is drawn to its seat, especially when imperfect seating between the parts occurs. Now, I have overcome these and kindred objections that have accumulated against cast metal connections or shank members by substituting a drawn metal tube or pipe therefor, and which has been found to be greatly superior to cast connections for sundry reasons, as will now appear. Thus, a drawn tube or connection is superior to cast metal on account of being drawn to uniform thickness and strength at all points, and it has no imperfections or flaws here or there in the metal, as are liable to be found in castings and no leakage under high pressure. Furthermore, these connections are perfectly smooth internally and externally, thus requiring less finishing, and by providing a tapered seat by die work, as is my practice, I obtain a much more accurate seat than can be made by machine work, which varies. Drawn metal has also greater tensile strength than cast metal and is readily formed into any required shape, all of which lends itself to my purpose which involves a construction of shank member permitting its use with perfect safety and sealing effect with any of the varying makes and different forms and styles of coupling members in general use.

Now, having reference to Fig. 1, C represents one form of the said tubular connections or shanks, provided with a collar or flange 2 at one end and an inwardly turned and tapered seat 3 at the other end. This seat is formed directly out of the tube itself by reversely and inwardly bending or upsetting the end thereof by means of a die in any approved and mechanical way. In this particular form an open annular space remains between said seat and the wall of the tube and there is no backing for the side of the seat. This provides a slightly yielding seat and it will be noted that the strongest and most unyielding portion of the tube is at the immediate end where bent back upon itself and where a split is otherwise apt to occur if the coupling nut is screwed too far inward and when a metallic tapering head is used and brought too tightly to its seat. A yielding seat will adapt itself to any irregularities or roughness between the seating parts and a more efficient and safer action is thereby assured than if the seat were solid and unyielding. In Fig. 2 the said connection $C^2$ is similar to Fig. 1 in all particulars except that the inner edge portion 4 of seat 5 is drawn or bent outward at substantially right angles and forms an annular flange or backing against the wall of the tube. Otherwise, the said seat 5 is identical with seat 3 in Fig. 1, and though not as yielding as therein, a certain measure of surrender axially of the tube manifests itself when the coupling nut is screwed up and a metal to metal connection is drawn tightly together.

Fig. 3 shows the tube or connection $C^3$ with a seat 3 as in Fig. 1, but instead of having a flange 2 at its other end, it is threaded internally at 7 and has an annular bead 8 near its middle. Said bead may be a separate piece fixed thereon, or as in this instance, developed from within and standing out upon or from the surface of the tube sufficiently to form a rounded shoulder to engage the flange D' and whereby said flange may be inclined more or less in respect to the tube and still have a firm bearing engagement therewith all around at bead 8.

In Figs. 1, 2, and 4, the tube is externally threaded at 9 from its seat end a sufficient depth to thread the flange D thereon, and the said flange has an inwardly turned and internally threaded seating portion $d$ engaged on said external thread 9.

The construction employed in Fig. 3 has the advantage that this particular tube or shell can be used with a plain flange that has no threads therein, thus saving expense in manufacture and adapting the flange to be inclined to correspond with the inclination of the wall or body against which it bears, for example as the inclined wall of a bath tub.

The connection or shank $C^4$ in Fig. 4 is like Fig. 1 in its seat 3 and external thread 9 but has an enlarged or expanded end or head 12, threaded within to make connection with externally threaded male member E, and which enlargement takes the place of coupling nut A. This shank shows the threads as rolled or formed out of the metal to provide both an internal and external thread.

In all the examples of connections or shanks shown the tapered seat constitutes an internal reinforcement for the relatively thin tube at its end to resist the pull and compressive strain of coupling nut L. In all the figures, said internal portion being separated from the main wall the greater part of its length, there is more or less give or springlike effect to said seat which contributes to the making of a better seal, also removes any danger of splitting of the outer tube under excessive strain as might occur by drawing up a metal to metal seat too tightly. This reinforcement also provides a seating portion, so that said seat, so-called, has a double function and purpose. The outer threaded circumference of the said connection is necessarily of uniform diameter to provide for adjustable locking connection with the bath tub and to receive nut L. The extreme end of said connection at bend 10 may also bear against a flat washer within coupling nut L to supplement the seal obtained by the conical seal parts, or even alone if occasion arises where only a flat washer is to be found or can be used.

In some instances both flange $g$ and gasket H are of metal and integral or rigidly affixed to pipe G, and although those in general use correspond in near degree in size and shape there is also a marked variation so that perfect seating between two opposite coupling members of two different makes is the exception rather than the rule.

What I claim is:—

1. A tubular coupling member of drawn metal of the same diameter end to end having an annular tapered reinforcement internally at one end adapted to seat a conical sealing member therein and provided with an outwardly turned flange at its opposite end.

2. A shank member for couplings, comprising a drawn metallic tube having a threaded exterior portion and an inturned flange at its intake end adapted to provide a tapering seat for coupling connections and having its other end outwardly bent to provide an annular coupling flange.

3. A shank member for couplings, comprising a drawn metallic tube having its opposite ends constructed to be detachably connected with a water fixture and a supply pipe coupling, respectively, the intake end of said tube being bent inwardly with its inner edge bent outwardly against the wall of the tube and the other end of said tube being bent outwardly to provide a flange for a coupling member.

4. A shank member for couplings comprising a drawn metallic tube having one end externally threaded and bent inwardly on converging lines to provide a tapering sealing seat and with the inner edge thereof bent outwardly to form a backing flange against the wall of said tube.

In testimony whereof I sign this specification in the presence of two witnesses.

JOSEPH H. GLAUBER.

Witnesses:
K. B. MOSER,
F. C. MUSSEM.